(12) United States Patent
Wilhelmsson et al.

(10) Patent No.: US 8,594,210 B2
(45) Date of Patent: Nov. 26, 2013

(54) METHOD AND APPARATUS FOR POSITIONING AN FFT-WINDOW IN AN OFDM-RECEIVER

(75) Inventors: Leif Wilhelmsson, Dalby (SE); Lars Björkman, Malmö (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 12/746,518

(22) PCT Filed: Dec. 8, 2008

(86) PCT No.: PCT/EP2008/067000
§ 371 (c)(1),
(2), (4) Date: Sep. 5, 2010

(87) PCT Pub. No.: WO2009/074530
PCT Pub. Date: Jun. 18, 2009

(65) Prior Publication Data
US 2011/0002403 A1 Jan. 6, 2011

Related U.S. Application Data

(60) Provisional application No. 61/013,353, filed on Dec. 13, 2007.

(30) Foreign Application Priority Data

Dec. 10, 2007 (EP) .................................. 07122778

(51) Int. Cl.
*H04L 27/28* (2006.01)

(52) U.S. Cl.
USPC ........... 375/260; 375/259; 375/316; 375/346; 375/347; 375/348

(58) Field of Classification Search
USPC .......... 375/260, 259, 316, 346, 347, 348, 349
See application file for complete search history.

(56) References Cited

U.S. PATENT DOCUMENTS 6,058,121 A * 5/2000 Kim et al. ..................... 370/480
(Continued)

FOREIGN PATENT DOCUMENTS

EP 2071784 A1 6/2009
WO 2006/111276 A 10/2006

OTHER PUBLICATIONS

PCT International Search Report, dated Feb. 2, 2009, in connection with International Application No. PCT/EP2008/067000.
Ramasubramanian, K. et al. "An OFDM timing recovery scheme with inherent delay-spread estimation" GLOBECOM'01. 2001 IEEE Global Telecommunications Conference. San Antonio, TX, Nov. 25-29, 2001, New York, NY, IEEE, US, vol. 5, Nov. 25, 2001, pp. 3111-3115, XP010747382. ISBN: 978-0-7803-7206-1.
(Continued)

Primary Examiner — Kenneth Lam
(74) Attorney, Agent, or Firm — Potomac Patent Group, PLLC (57) ABSTRACT

Methods for positioning an FFT-window in an OFDM-receiver are disclosed as well as electronic apparatuses and computer program products for performing the methods. The method comprises determining a position of the FFT-window in relation to one or more OFDM-symbols of a received OFDM-signal, using the position of the FFT-window to obtain a first OFDM-symbol from the received OFDM-signal, and applying an FFT to the first OFDM-symbol to produce an FFT-output signal. The method also comprises determining a frequency dependent phase rotation component of the FFT-output signal, and removing the determined frequency dependent phase rotation component from the FFT-output signal to obtain a compensated FFT-output signal. A delay spread estimate is calculated based on at least one of the FFT-output signal and the compensated FFT-output signal, and the position of the FFT-window is adjusted based on at least the determined frequency dependent phase rotation component and the calculated delay spread estimate.

19 Claims, 4 Drawing Sheets

(56) References Cited

U.S. PATENT DOCUMENTS

| | | | |
|---|---|---|---|
| 6,650,617 B1* | 11/2003 | Belotserkovsky et al. | 370/210 |
| 6,853,616 B1 | 2/2005 | Kim et al. | |
| 7,440,506 B2* | 10/2008 | Atungsiri et al. | 375/260 |
| 7,602,852 B2* | 10/2009 | Berkeman et al. | 375/260 |
| 7,664,189 B2* | 2/2010 | Kawauchi | 375/260 |
| 2003/0026360 A1* | 2/2003 | Ramasubramanian et al. | 375/343 |
| 2004/0005010 A1* | 1/2004 | He et al. | 375/260 |
| 2004/0105512 A1* | 6/2004 | Priotti | 375/340 |
| 2004/0110510 A1* | 6/2004 | Jeon et al. | 455/450 |
| 2006/0159203 A1 | 7/2006 | Poloni et al. | |
| 2006/0203710 A1* | 9/2006 | Mukkavilli et al. | 370/208 |
| 2006/0215778 A1* | 9/2006 | Murthy et al. | 375/260 |
| 2006/0239179 A1* | 10/2006 | Berkeman et al. | 370/208 |
| 2008/0219144 A1* | 9/2008 | Brehler et al. | 370/203 |
| 2011/0019749 A1* | 1/2011 | Wilhelmsson et al. | 375/259 |

OTHER PUBLICATIONS

Witrisal, K. "On estimating the RMS delay spread from the frequency-domain level crossing rate", IEEE Commun. Letters, Jul. 2001, pp. 287-289.

Faulkner, M. et al. "Low-Complex ICI Cancellation for Improving Doppler Performance in OFDM Systems" Proceedings of IEEE Vehicular Technology Conference, Fall 2006, Sep. 25-28, 2006, Montreal, Canada, pp. 1-5, ISBN: 1-4244-0062-7.

Bottomley, G. et al. "Recycling the Cyclic Prefix in an OFDM System" Proceedings of IEEE Vehicular Technology Conference, Fall 2006, Sep. 25-28, 2006, Montreal, Canada, pp. 1-5.

Van De Beek, J. J. et al. "A Time and Frequency Synchronization Scheme for Multiuser OFDM", IEEE Journal on Selected Areas in Communications, vol. 17, No. 11, Nov. 1999.

* cited by examiner

METHOD AND APPARATUS FOR POSITIONING AN FFT-WINDOW IN AN OFDM-RECEIVER

CROSS-REFERENCE TO RELATED APPLICATIONS

This application claims priority under 35 U.S.C. §119 to European Patent Application No. 07122778.9 filed Dec. 10, 2007, which is hereby incorporated herein by reference in its entirety. This application also claims the benefit of U.S. Provisional Application No. 61/013,353, filed Dec. 13, 2007, which is hereby incorporated herein by reference in its entirety.

TECHNICAL FIELD

The present invention relates generally to the field of processing received signals in communication systems. More particularly, it relates to positioning of an FFT-window in an OFDM-receiver.

BACKGROUND

Orthogonal Frequency Division Multiplexing (OFDM) is an access technique that is being used in wireless local area networks (WLAN), such as IEEE 802.11a, and IEEE802.11g, as well as in different standards for broadcast, such as Digital Video Broadcasting-Terrestrial (DVB-T), DVB-Handhelds (DVB-H), Terrestrial Digital Multimedia Broadcasting (T-DMB), and Digital Audio Broadcasting (DAB). It is also the chosen access technique for Universal Mobile Telecommunications System-Long Term Evolution (UMTS LTE), a telecommunication standard promulgated by the $3^{rd}$ Generation Partnership Project (3GPP).

In OFDM, the data is transmitted in parallel on a number of sub-carriers, which may be efficiently implemented by using an inverse fast Fourier transform (IFFT) in the transmitter, and a fast Fourier transform (FFT) in the receiver. If the size of the FFT is N, then N samples at the output of the FFT are referred to as an OFDM-symbol (i.e. a frequency domain OFDM-symbol). Typical values of N may range from 64 (used in e.g. WLAN) to 8192 (used in e.g. DVB-T). Values outside this range may, however, also be applicable.

In wireless communication, there is often a discrepancy between the transmitted and the received signal. This discrepancy may typically be due to a multi-path channel and noise. A multi-path channel, over which the signal is transmitted, often introduces time-dispersion to the signal. This may have the effect that symbols transmitted at different instants of time will interfere with one another to a certain extent at the receiver. This phenomenon is commonly referred to as inter-symbol interference (ISI). In OFDM, a cyclic prefix (CP) may be used to mitigate, at least partly, any negative impact resulting from ISI.

Figure 1:
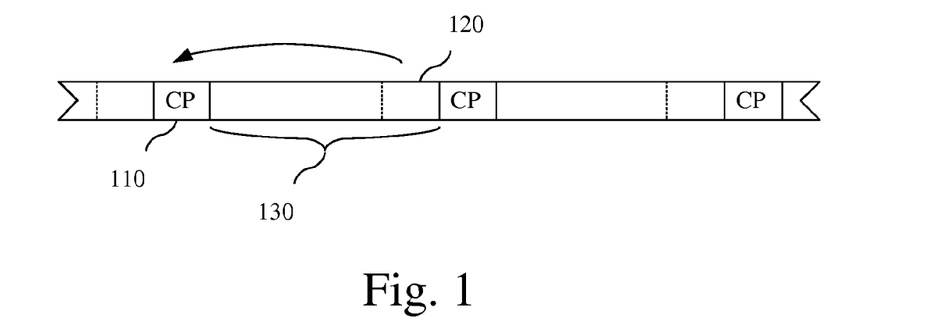
FIG. 1 is a diagram illustrating an example transmitted OFDM-signal.

An illustration of a transmitted OFDM-signal with cyclic prefixes is provided in FIG. 1. In the figure, it is illustrated how the CP 110 may be created by copying the last part 120 of an OFDM-symbol 130 output from the IFFT and appending the copy just before the symbol. Thus, a transmitted (time domain) OFDM-symbol comprises the actual OFDM-symbol (or the useful part of the OFDM-symbol) 130 and a CP 110.

Figure 2:
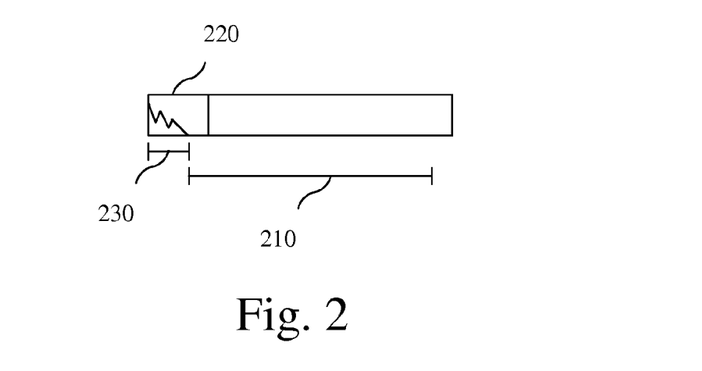
FIG. 2 is a diagram illustrating inter-symbol interference and an example FFT-window placement for an OFDM-symbol.

At the receiver side, a part of the received signal corresponding to the CP may be discarded before the signal is demodulated by the FFT. The issue of determining which part of the signal should be discarded and which part should be input to the FFT is commonly referred to as time synchronization. Thus, time-synchronization is typically referred to as the problem of finding the moment in time when to sample a signal in order to obtain as good performance as possible. Throughout the application, time-synchronization will be referred to as placement or positioning of an FFT-window. In FIG. 2, an illustration of a possible placement of the FFT-window 210 is shown. In FIG. 2, it is also illustrated that the initial part 230 of the CP 220 has been corrupted due to ISI.

In communication systems where high bandwidth efficiency is desired, it is advantageous to have an estimation of the communication channel. The estimation is commonly determined in a channel estimator in the receiver. Estimating the communication channel may comprise estimating the impulse response of the channel if the channel is estimated in the time domain. If the channel is estimated in the frequency domain, the estimation may comprise estimating the transfer function of the channel. When a communication system is based on, for example, direct-sequence spread spectrum (DSSS), as is the case in the UMTS standard for Wideband Code Division Multiple Access (WCDMA), the channel is typically estimated in the time domain. When a system is based on OFDM on the other hand, the channel may typically be estimated in the frequency domain.

Channel estimation is one of the most critical tasks within a communication receiver in order to obtain good performance. It is typically also one of the more computationally intensive tasks in the receiver.

One approach to enable channel estimation is to transmit one or more known symbols and use these symbols for channel estimation. The known symbols may be transmitted separately as is done on the Common PIlot CHannel (CPICH) of UMTS. The known symbols may also be transmitted among the actual data as is done in OFDM for UMTS-LTE. The known symbols are commonly referred to as pilot symbols or reference symbols.

Figure 3:
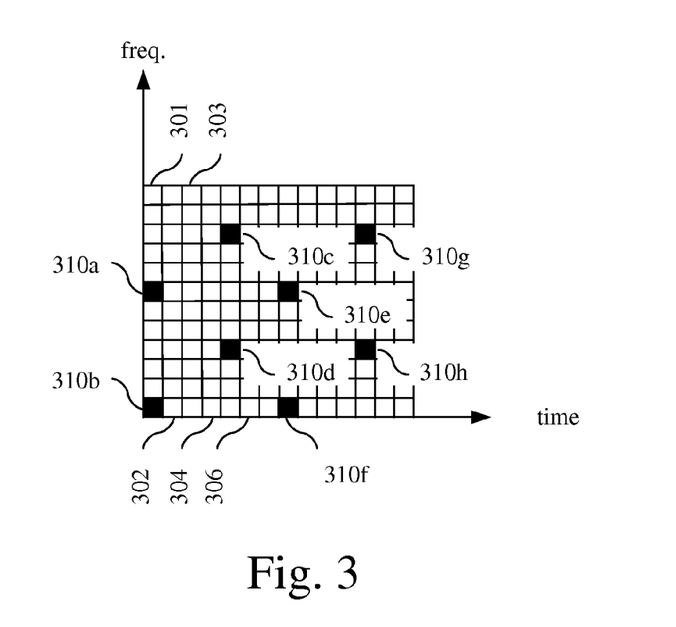
FIG. 3 is a diagram illustrating example pilot symbol placements in OFDM-signals.

FIG. 3 illustrates an example distribution of pilot symbols 310a-h within a time-frequency grid of transmitted signals in an OFDM-system. FIG. 3 illustrates example OFDM-signals before IFFT-processing in the transmitter. The corresponding time-frequency grid will be found in the receiver after FFT-processing. In FIG. 3, it may be noted that pilot symbols 310a and 310b are transmitted in OFDM-symbol 301, that OFDM-symbols 302, 303, and 304 do not comprise any pilot symbols, and that pilot symbols 310c and 310d are transmitted in OFDM-symbol 305. Furthermore, it may be noted that pilot symbols 310a and 310b are transmitted on different sub-carriers compared to pilot symbols 310a and 310b.

When the channel has been estimated at the positions where there are pilot symbols available, using any known method for channel estimation, the channel may also be estimated at the other positions in the time-frequency grid. One way of performing this estimation is by means of interpolation in frequency and/or in time. For this purpose, finding a suitable interpolation filter, that may be used to interpolate between the channel estimates at the positions of the pilot symbols, may be an important part of the setting up the channel estimation process.

For interpolation in time, the filter may be chosen based on how fast the channel is changing in the time direction. This type of channel variation is commonly referred to as the Doppler spread of the channel. Similarly, for interpolation in frequency, the filter may be chosen based on how frequency selective the channel is. This channel variation in the frequency direction is caused by the delay spread of the channel. There is a linear relation between the delay spread of the channel and how selective the channel is.

If, for example, a Wiener filter is used for interpolation between the channel estimates at the pilot symbol positions, the filter parameters may be chosen based on the correlation function of the channel in both time and frequency. The correlation functions in time and frequency can be estimated from the Doppler spread and the delay spread respectively. Knowledge of the Doppler spread and the delay spread may also be useful for simpler channel estimation approaches. For example, the Doppler spread and the delay spread may be used to determine an appropriate amount of filtering for interpolation in time and frequency respectively.

Thus, it is important to have an accurate estimate of the Doppler spread and of the delay spread. To enable optimal operation of the receiver in terms of, for example, channel estimation and delay spread estimation, and thus a good demodulation performance, it is important to avoid ISI. This is achieved by positioning the FFT-window such that no ISI is present when a received OFDM-symbol is fed into the FFT.

Hence, positioning the FFT-window is an important part of an OFDM-receiver.

U.S. Pat. No. 6,058,121 discloses a fine fast Fourier transform window position recovering apparatus of an OFDM system receiver. The phase error of the FFT-window is adjusted by using the number of zero-crossings of the phase variation.

U.S. Pat. No. 6,853,616 discloses a receiver and method for FFT-window position recovery. Inter-pilot phase differences are detected, averaged and normalized, and the FFT-window position offset is controlled using a value obtained by rounding off the normalized value.

It is a problem that the placement of the FFT-window may be inferior or erroneous due to, for example, time dispersion (the delay spread of the channel) and noise.

Thus, there is a need for accurate, low complex and robust methods and apparatuses for FFT-window positioning in an OFDM-receiver. Such methods and apparatuses should preferably also provide for a channel estimator of low complexity to be used without sacrificing in performance.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods and apparatuses for positioning an FFT-window in an OFDM-receiver.

According to a first aspect of the invention, this is achieved by a method for positioning a fast Fourier transform (FFT) window in an Orthogonal Frequency Division Multiplexing (OFDM) receiver. The method comprises determining a position of the FFT-window in relation to one or more OFDM-symbols of a received OFDM-signal, using the position of the FFT-window to obtain a first OFDM-symbol from the received OFDM-signal, and applying an FFT to the first OFDM-symbol to produce an FFT-output signal. Furthermore, the method comprises determining a frequency dependent phase rotation component of the FFT-output signal, and removing the determined frequency dependent phase rotation component from the FFT-output signal to obtain a compensated FFT-output signal. The method also comprises calculating a delay spread estimate based on at least one of the FFT-output signal and the compensated FFT-output signal, and adjusting the position of the FFT-window based on at least the determined frequency dependent phase rotation component and the calculated delay spread estimate.

In one or more embodiments, the method may further comprise using the adjusted position of the FFT-window to obtain a second OFDM-symbol from the received OFDM-signal, and applying an FFT to the second OFDM-symbol. The second OFDM-symbol may be identical to or different from the first OFDM-symbol. This may have the advantage that the second OFDM-symbol is obtained using a more perfectly positioned FFT-window, which in turn may provide for better robustness to ISI and noise.

The step of removing the determined frequency dependent phase rotation component may, in some embodiments, be performed prior to the step of applying an FFT to the second OFDM-symbol and comprise re-ordering samples of the second OFDM-symbol based on the determined frequency dependent phase rotation component.

In some embodiments, the step of removing the determined frequency dependent phase rotation component comprises re-ordering samples of the first OFDM-symbol based on the determined frequency dependent phase rotation component and re-applying the FFT to the first OFDM-symbol.

In some embodiments, the step of removing the determined frequency dependent phase rotation component may be performed after the step of applying an FFT to the first OFDM-symbol and comprise de-rotating samples of the FFT-output signal.

In one or more embodiments, the method may further comprise determining, based on at least one of the FFT-output signal and the compensated FFT-output signal, a transfer function of a channel over which the received OFDM-signal has been transmitted, and the step of calculating a delay spread estimate may comprise determining a number of zero-crossings of at least one of a real component and an imaginary component of the transfer function, and calculating the delay spread estimate based on the determined number of zero-crossings.

The transfer function may be determined in a channel estimator of the OFDM-receiver according to some embodiments of the invention.

In some embodiments, the frequency dependent phase rotation component may be determined as an average frequency dependent phase rotation component.

The method may further comprise determining a width of the FFT-window based on at least the calculated delay spread estimate and/or determining a shape of the FFT-window based on at least the calculated delay spread estimate according to some embodiments of the invention. This may have the advantage that more signal energy may be utilized in the processing of OFDM-symbols in the received OFDM-signal, and thus improve the processing performance.

A second aspect of the invention is a computer program product comprising a computer readable medium, having thereon a computer program comprising program instructions, the computer program being loadable into a data-processing unit and adapted to cause the data-processing unit to execute the method according to the first aspect when the computer program is run by the data-processing unit.

A third aspect of the invention is an electronic apparatus for positioning an FFT-window in an OFDM-receiver. The electronic apparatus comprises FFT-window placement circuitry adapted to determine a position of an FFT-window in relation to one or more OFDM-symbols of a received OFDM-signal and to use the position of the FFT-window to obtain at least one OFDM-symbol from the received OFDM-signal, FFT circuitry adapted to produce an FFT-output signal from the at least one OFDM-symbol, and at least one delay spread estimator adapted to calculate a delay spread estimate. The electronic apparatus further comprises circuitry adapted to determine a frequency dependent phase rotation component of the FFT-output signal, and circuitry adapted to remove the determined frequency dependent phase rotation component from the FFT-output signal to obtain a compensated FFT-output signal. The at least one delay spread estimator is further adapted to calculate the delay spread estimate based on at least one of the FFT-output signal and the compensated FFT-output signal, and the FFT-window placement circuitry is further adapted to adjust the position of the FFT-window based on at least the determined frequency dependent phase rotation component and the calculated delay spread estimate.

The third aspect may additionally have features identical with or corresponding to any of the various features as explained above for the first aspect of the invention.

The electronic apparatus according to the third aspect may, according to some embodiments, be compliant with the Universal Mobile Telecommunications System Long Term Evolution standard.

In some embodiments, the electronic apparatus may be a portable or handheld mobile radio communication equipment, a mobile radio terminal, a mobile telephone, a pager, a communicator, an electronic organizer, a smartphone, a computer, an embedded drive, a mobile gaming device, a watch or a base station.

One of the advantages of embodiments of the invention is that methods and apparatuses for positioning an FFT-window are provided. A further advantage of embodiments of the invention is that these methods and apparatuses are accurate, robust and have low complexity. In particular, robustness against time dispersion and noise is achieved as well as robustness against an inferior or erroneous initial position of the FFT-window.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

In the following, a number of embodiments of the invention will be presented wherein a position of an FFT-window is determined and adjusted in an OFDM-receiver. In some embodiments, a shape and/or length of the FFT-window is also adjusted. Throughout the description, example embodiments of the invention will focus on UMTS LTE. It should be noted, however, that this is done to simplify the description and is by no means limiting to the invention. Contrarily, embodiments of the invention are equally applicable to other communication standards based on OFDM such as, for example, IEEE 802.11a, IEEE802.11g, WiMAX (IEEE 802.16), DVB-T, DVB-H, T-DMB, and DAB.

Furthermore, embodiments of the invention may be described for an OFDM-system where parameters have specific numerical values. This is done to simplify the description and to ease the illustration of embodiments of the invention, and is by no means intended to limit the scope of the invention. It is obvious to a skilled artisan that embodiments of the invention are equally applicable for other choices of parameter values.

The parameters chosen to illustrate embodiments of the invention are as follows: The sub-carrier spacing is 15 kHz and the total number of available sub-carriers is 1200 (excluding the sub-carrier transmitted at DC). Consequently, the totally occupied bandwidth amounts to roughly 18 MHz. The sub-carriers are divided into resource blocks, each containing 12 sub-carriers. Moreover, each resource block consists of 7 OFDM-symbols. The sampling rate is 30.72 MHz and the FFT size is N=2048.

A placement of the FFT-window that includes part of the CP (of either the same OFDM-symbol or of the subsequent OFDM-symbol) causes a phase drift in the FFT-output, i.e. different sub-carriers of the FFT-output within the same OFDM-symbol are subject to different phase shifts. This phase drift manifests itself as a rotation factor when studying the transfer function in the IQ-plane after the FFT has been applied. It should be noted that the rotation is in the frequency direction as opposed to the case of a frequency offset, when a rotation is seen in the time direction. In the following, the phase drift will be referred to as frequency dependent phase rotation, or phase rotation for short.

A problem with solutions for estimating the frequency dependent phase rotation is that no distinction is made with regard to the cause of the rotation. For example, the cause may be a channel with a large delay spread, or it may be that the FFT-window has been positioned early or late in relation to the useful part of the OFDM-symbol. Thus, the information obtained from the estimated phase rotation may not be suitable for positioning of the FFT-window, but only to remove the rotation as such.

In OFDM-receivers, the placement of the FFT-window may be handled separately from the delay spread estimation and estimation and removal of the frequency dependent phase rotation. However, adequate time synchronization (FFT-window placement) is particularly difficult to obtain when there is a significant delay spread, and the FFT-window placement may be inferior or incorrect due to delay spread and/or due to frequency dependent phase rotation. Hence, taking these parameters into account may improve the positioning of the FFT-window according to embodiments of the invention.

According to embodiments of the invention, the FFT-window placement and the delay spread of the channel are estimated by considering how the phase is changing across the sub-carriers in one or more OFDM-symbols of an OFDM-signal. The frequency dependent phase rotation across the symbol bandwidth may be determined and compensated for. In some embodiments, the frequency dependent phase rotation is determined as an average value over one or more OFDM-symbols.

The delay spread may, for example, be estimated by considering the phase fluctuations in one or more OFDM-symbols where the frequency dependent phase rotation has been compensated for. The estimations of the frequency dependent phase rotation and the delay spread may be used to position the FFT-window according to some embodiments of the invention.

The delay spread of the channel may be obtained by estimating what the impulse response looks like. This may, for instance, include processing of the received signal prior to FFT-processing. An estimate of the delay spread of the channel may alternatively be obtained by making use of the linear relationship between the delay spread of the channel and how selective the channel is, which may result in less complex delay spread estimation procedures.

K. Witrisal "On estimating the RMS delay spread from the frequency-domain level crossing rate", IEEE Commun. Letters, July 2001, pp. 287-289, discloses a method where this linear relationship was exploited by evaluating the number of crossings of a level of the amplitude of a transfer function.

US 2006/0159203 A1 discloses an operation of estimation of a delay spread which comprises evaluation of a mean number of crossings of the real and imaginary parts of the channel transfer function. This approach is commonly referred to as a zero-crossing algorithm.

Example principles of calculating a delay spread estimate are also disclosed in European patent application no. EP2071784 to Telefonaktiebolaget LM Ericsson (publ.) with the title "Method and apparatus for delay spread estimation", and filed Dec. 10, 2007, the same date as the current application.

Suppose that the channel has no time-dispersion, i.e., that the channel consists of a single path. In this case the FFT-window can start anywhere in the CP, without introducing any ISI. It can, however, not be placed later if ISI is to be avoided. For this reason, the start of the FFT-window may typically be chosen a number of samples prior to the last sample in the CP, in order to have some margin to accidentally placing it too late and thus introducing ISI.

Although placing the FFT-window a few samples earlier than needed does not cause any ISI in this situation, it causes a frequency dependent phase rotation at the output of the FFT. This phase rotation may make channel estimation unnecessarily complex. This may be particularly pronounced if the channel estimation to some extent is based on interpolation in the frequency direction. Furthermore, the phase rotation may disturb delay spread estimation algorithms and decrease their accuracy. Therefore, removing the phase rotation before performing the channel estimation and delay spread estimation may be advantageous in accordance with some embodiments of the invention. It may be noted that the placement of the FFT-window does not affect the amplitude function of the experienced channel, only on the phase.

Figure 4:
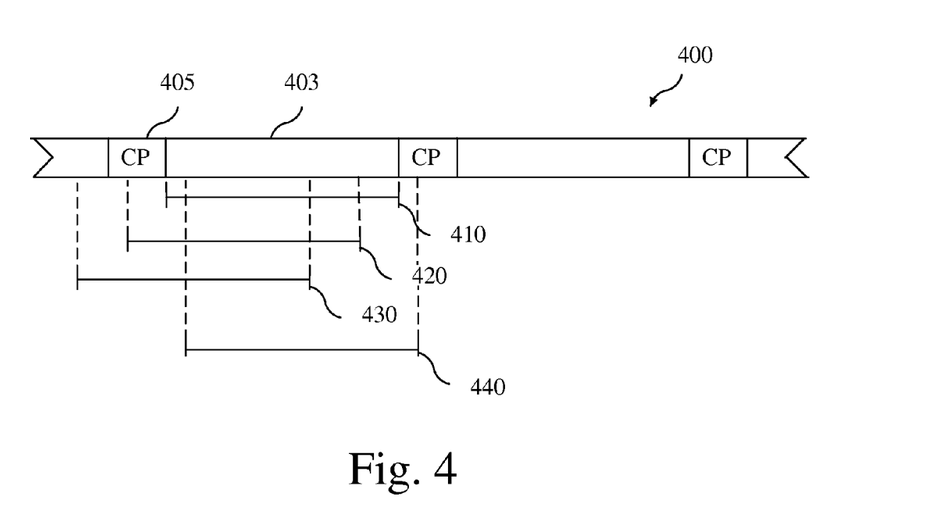
FIG. 4 is a diagram illustrating different example placements of the FFT-window.

FIG. 4 illustrates a received OFDM-signal 400, comprising a useful part of an OFDM-symbol 403 and corresponding cyclic prefix (CP) 405. A number of different placements of the FFT-window 410, 420, 430, 440 are shown in FIG. 4 in relation to the received OFDM-symbol 403 and its cyclic prefix 405.

FFT-window placement 410 is in perfect synchronization with the useful part of the OFDM-symbol 403, while FFT-window placements 420, 430 and 440 are not perfectly synchronized with the useful part of the OFDM-symbol 403. Placements 430 and 440 will lead to inter-symbol interference, since they overlap the previous OFDM-symbol and the cyclic prefix of the following OFDM-symbol respectively. Placement 420, however, is applicable due to the cyclic prefix. Placement 420 may even be preferable in some situations, since it introduces a margin against errors, such as inter-symbol interference and time synchronization errors. Using placement 420 to select the FFT input will, however, result in a phase drift in the transfer function of the FFT-output as explained above.

If the channel has some time-dispersion, i.e., if the channel consists of several paths that have different propagation delays, and the FFT-window is positioned so that no ISI is experienced, there will inevitably be a frequency dependent phase rotation.

Figure 5:
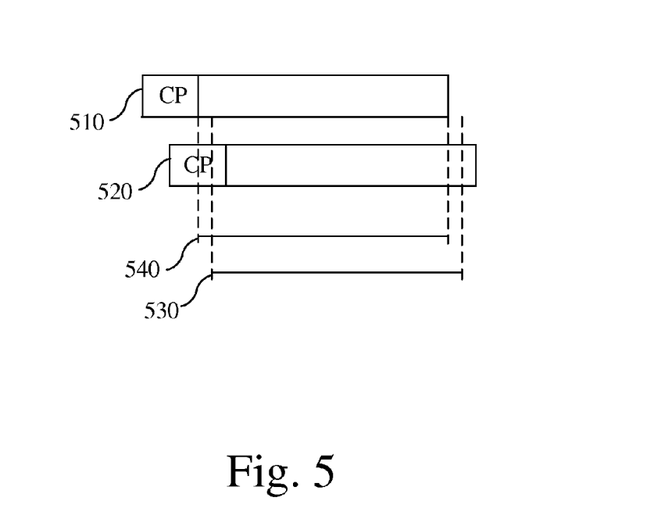
FIG. 5 is a diagram illustrating different example placements of the FFT-window.

This scenario is illustrated in FIG. 5, where an OFDM-symbol is received through a time dispersive channel having two paths. Thus, two versions 510 and 520 of the OFDM-symbol are received at different instants in time. If the FFT-window is placed as illustrated by FFT-window placement 530, i.e., such that it covers equally long portions of the useful parts of each of the received versions, then no phase rotation results. However, ISI is experienced since the FFT-window will cover part of the CP from the subsequent OFDM-symbol. Hence, in this situation an FFT-placement 540 may be chosen to avoid ISI. Such a placement implies a frequency dependent phase rotation that is caused by the placement in relation to version 520.

To further illustrate the effect of the placement of the FFT-window on the phase rotation, let $H_{k,n}$ denote the channel for OFDM-symbol k and sub-carrier n, and express the channel in polar coordinates, i.e., as an amplitude and phase;

$$H_{k,n} = \alpha_{k,n} \exp(j\phi_{k,n}).$$

When the channel only consists of a single path, the start of the FFT-window can be anywhere in the CP without introducing ISI. If the FFT-window is started so that l samples from the CP are included (and l samples at the end of the OFDM-symbol are excluded), then the effective channel as experienced at the output of the FFT will be $$H_{k,n} = \alpha_{k,n} \exp(-j2\pi n l/N),$$

where $\alpha$ is a complex constant representing the attenuation of the channel. Due to the assumption of a single path channel, the attenuation is the same for all sub-carriers. Thus, depending on the position of the FFT-window, which is reflected by the parameter l, the phase rotation across the sub-carriers can be substantial.

Suppose, for instance, that the FFT-window is placed so that 100 samples from the CP are used, i.e., l=100. Then the total rotation over the N sub-carriers will be 100 full rotations (200π). Considering only one resource block of 12 sub-carriers, the phase rotation between the sub-carriers at the ends of the resource block will be 11·100·2π/2048≈1.1π. Thus, the phase will change more than 180 degrees over a resource block.

Since this phase rotation is due to the placement of the FFT-window, it will remain the same for all OFDM-symbols, and can therefore be estimated and to some extent compensated for, e.g. by properly rotating the different sub-carriers.

It should be noted that if the FFT-window is placed too late, then inter-symbol-interference (ISI) is present even after the phase rotation has been compensated for.

When the channel is a multi-path channel, the received signal will effectively consist of several versions of the transmitted signal (compare with FIG. 5), and each version may have a different delay and a different complex attenuation. Since the received versions from the different paths will add constructively and destructively depending on the frequency, the channel will appear as being more or less frequency selective. If the delay spread is large (for example, if the duration of the impulse response of the channel is almost as long as the CP), the channel will be very frequency selective. If the delay spread is small (for example, if the duration of the impulse response is just a few samples), then the channel will appear as relatively flat over the used bandwidth.

For the purpose of illustration, suppose that the channel consists of only two taps of equal strength and separated by $T_m$ seconds (which, in this example, corresponds to l samples) and that the FFT-window is placed as late as possible without causing any ISI (compare with FFT-window placement 540 in FIG. 5). Then the transfer function of the channel will equal $$H(f)=1+\exp(-j2\pi f T_m)=2\exp(-j\pi f T_m)\cos(\pi f T_m),$$

which, expressed in terms of the sampling rate, $T_s$, and sub-carrier, n, ($T_m=lT_s$ and $f_n=n/(NT_s)$) becomes $$H(f_n)=2\exp(-j\pi nl/N)\cos(\pi nl/N).$$

Thus, in this example there will be a frequency dependent phase rotation that is the same as if the channel was a single path channel and the FFT-window was placed l/2 samples into the CP.

Hence, a phase rotation may be due to an early (or lately) placed FFT-window and/or to a large delay spread of the channel.

The frequency dependent phase rotation can be calculated if the channel impulse response and the FFT-window placement are known. In practice, however, the frequency dependent phase rotation may have to be estimated.

In some embodiments, the average phase rotation can be determined by estimating the centre of gravity of the different paths in the multi-path channel.

Example principles of estimating the frequency dependent phase rotation are disclosed in WO 2006/111276 A1. Methods to estimate the total amount of phase rotation were disclosed.

In addition to the average frequency dependent phase rotation, there may be random fluctuations if the channel is a multi-path channel. These random fluctuations may cause both amplitude and phase variations across the sub-carriers. The nature of such fluctuations may be associated to the delay spread of the channel.

As mentioned above, K. Witrisal "On estimating the RMS delay spread from the frequency-domain level crossing rate", IEEE Commun. Letters, July 2001, pp. 287-289, discloses a method where the number of crossings of a level of the amplitude of a transfer function is evaluated to estimate the delay spread of a channel. This approach may not provide any information regarding the placement of the FFT-window, since it does not consider phase fluctuations. Even so, the approach may be used in some embodiments of the invention to estimate the delay spread of the channel. Thus, in some embodiments of the invention, the delay spread estimation is performed based on the variations of the amplitude level of the signal. Since this algorithm is independent of the average frequency dependent phase rotation it may be performed before or after the frequency dependent phase rotation has been compensated for.

In some embodiments of the invention, the delay spread is estimated by evaluating the number of axis crossings of a transfer function of at least one of a real and imaginary axis per frequency unit. The result of this approach is affected by the frequency dependent phase rotation, caused e.g. by the FFT-window position. Hence, the delay spread estimation may preferably, but not necessarily, be performed after the phase rotation has been removed when using this delay spread estimation algorithm.

In embodiments of the invention, the estimated phase rotation and the delay spread estimate are used to adjust the position of the FFT-window. The estimated phase rotation gives information regarding the currently used FFT-window position. The delay spread estimation gives information that may be useful to avoid ISI.

If there is no delay spread, it may, for example, be advantageous to position the FFT-window so that it starts in the middle of the CP to allow a maximal margin for ISI as explained above. According to another example, the FFT-window may be placed according to FFT-window placement 410 in FIG. 4. In a further embodiment of the invention, the FFT-window may be placed as early as at the start of the CP or anywhere between the mentioned positions.

If, however, there is delay spread, the FFT-window might, for example, be placed according to FFT-window placement 540 in FIG. 5 or earlier, up to the point where ISI is introduced. (See also FFT-window placement 210 in FIG. 2.)

In some embodiments of the invention, the delay spread estimate is also used to determine the length and/or shape of the FFT-window. For example, if the delay spread is smaller than the duration of the CP, then part of the CP will not be interfered by the previous symbol. In such a case, the FFT-window may be broadened up to the point where it includes the entire useful part of the OFDM-symbol and the part of the CP not interfered by the previous symbol. This approach might be used to further enhance the performance of the receiver, since additional symbol energy becomes available and may be used in the subsequent processing.

When the FFT-window is broadened, it may be even more important to accurately position the window. Furthermore, it may be more important to accurately estimate the delay spread of the channel.

If the FFT-window is broadened, which implies that additional samples are included in the FFT-window, the FFT-window may, according to some embodiments of the invention, be shaped so that the FFT-window profile deviates from the brick wall shape that is commonly used. Alternatives to the brick wall shape may, for example, be found in M. Faulkner, L. Wilhelmsson and J. Svensson, "Low-Complex ICI Cancellation for Improving Doppler Performance in OFDM Systems", and in G. Bottomley and L. Wilhelmsson, "Recycling the Cyclic Prefix in an OFDM System", both in proceedings of IEEE Vehicular Technology Conference, fall 2006, Montreal, Canada.

To further exemplify methods according to some embodiments of the invention, suppose that the length of the CP is 144 samples and that N is 2048. According to these embodiments, the FFT-window may initially be placed using some algorithm that is based on the signal prior to the FFT. Such an algorithm may be based on e.g. correlation with the CP. Such techniques are well known, and examples may be found in J.-J. van de Beek, et. al., "A Time and Frequency Synchronization Scheme for Multiuser OFDM", IEEE Journal on Selected Areas in Communications, vol. 17, no. 11, November 1999. In the current example, suppose that a brick wall shaped window is used, and that the FFT-window is placed so that l=10, i.e. 10 samples from the CP are fed to the FFT. Then, the receiver may operate as described in the following.

The average phase rotation across the sub-carriers may be determined. For instance, this may be achieved by considering the phase of the pilot symbols transmitted in the first OFDM-symbol of a slot. Since there may be a rather large phase rotation over the full bandwidth, the average phase rotation between two adjacent reference signals may be considered, and the resulting value may be multiplied by N. Suppose, in this example, that the average phase rotation is determined to be $50 \cdot 2\pi$, i.e., that the phase rotation corresponds to 50 full rotations.

Next, the average phase rotation may be compensated after the FFT. This may, for example, be accomplished by multiplying the FFT-output signal by a frequency dependent phase. Alternatively, the average rotation may be removed by shifting the first 50 samples in the FFT-window to the end of the window before performing the FFT. The compensation for the average phase rotation may be applied to a subsequent OFDM-symbol. Alternatively or additionally, the compensation for the average phase rotation may be applied to the current OFDM-symbol. For example, in the latter case, samples may be shifted in the current OFDM-symbol and the FFT be re-applied before continuing the processing of the current OFDM-symbol.

With the average phase rotation removed, the variation of the phase of the transfer function may be determined. This may, for instance, be done by considering the number of times the real axis and the imaginary axis are crossed when going from the sub-carrier at the lowest frequency to the sub-carrier at the highest frequency. In this example, suppose that the relation between the number of axis crossings per unit bandwidth, also referred to as the zero-crossing rate (ZCR), and the delay spread of the channel, $\tau$, is $\tau = C \cdot ZCR$, i.e., that the delay spread is modeled as being proportional to the number of axis crossings per bandwidth unit. The constant C depends on how the delay spread is defined (e.g., root mean square (rms) delay spread, excess delay, maximum delay spread, etc) and also on the method used to count the axis crossings. According to some methods, all axis crossings are counted. According to other methods only the real or only the imaginary axis crossings are counted. According to yet other methods, a hysteresis is used as described in European patent application no. EP207184 to Telefonaktiebolaget L M Ericsson (publ.) with the title "Method and apparatus for delay spread estimation", and filed Dec. 10, 2007 the same date as the current application.

For the purpose of illustration, suppose that the delay spread is defined as the excess delay, i.e., the delay of the last path of the channel in excess to the first path of the channel. This excess delay may be interpreted as the duration of the impulse response of the channel. This delay spread measure does not include information regarding whether the last path is attenuated compared to the first path.

Suppose in the example that the delay spread is estimated to 2.6 µs. Since the sample frequency is 30.72 MHz, this corresponds to roughly 80 samples. Assuming a uniform delay profile, one may then estimate how the original FFT-window was placed in relation to the CP. Given a delay spread of 80 samples and an average phase rotation corresponding to 50 samples, this means that the estimated FFT-window placement is 10 (50−80/2=10) samples into the CP (which in this example happens to be exactly correct).

Based on the estimated delay spread and on the estimated FFT-window placement, the FFT-window placement may then be adjusted. Furthermore, the shape, as well as the length, of the FFT-window may be varied depending on the delay spread estimate. If a brick wall shaped FFT-window is preferred, the time-synchronization (i.e. the FFT-window placement) may be updated using the following reasoning.

According to the example, the channel will only cause interference to 80 of the 144 CP-samples. To make the time synchronization as robust as possible against ISI and estimation errors, the FFT-window may be placed so that it starts in the middle of the part of the CP that is not corrupted by interference. Since there are 144−80=64 samples not affected by ISI, the FFT-window start may be 32 samples into the CP. Hence, the FFT-window may be shifted 22 samples to the left from its current position.

Moving on from this example, further embodiments of the invention will now be described in which the frequency dependent phase rotation and an estimated delay spread are used to adjust the FFT-window position.

As explained above, the placement of the FFT-window will have an impact on how the phase is changed across the sub-carriers. For example, shifting the FFT-window by one sample may cause the phase to shift a full rotation if considered from the lowest to the highest sub-carrier at the FFT-output. According to some embodiments of the invention, the average phase rotation across the sub-carriers may be estimated and removed, before starting the delay spread estimation to enhance performance of the delay spread estimation.

According to some embodiments of the invention, the FFT-window placement is assumed to be known. In these embodiments, the phase rotation due to FFT-window placement is directly obtainable from the knowledge of the FFT-window placement and need not be estimated. One example of such a scenario is when a pre-FFT algorithm, which may be based on e.g. correlation with the CP, positions the FFT-window. Then, it may be assumed that the timing, and thus the resulting frequency dependent phase rotation, is known and the phase rotation may be compensated accordingly without first having to be estimated.

In some embodiments of the invention, the phase rotation, caused by the early (or late) FFT-window placement and the delay spread of the channel, is estimated by studying the rotation component of the estimated transfer function (based on the FFT-output signal) in an IQ-plane.

In other embodiments of the invention, the phase rotation, caused by the early (or late) FFT-window placement and the delay spread of the channel, is estimated by determining an average slope of the transfer function in a phase-frequency diagram. For example, phase differences between subsequent sub-carriers may be evaluated and averaged to determine the phase rotation.

In some embodiments of the invention, the estimated phase rotation is an average phase rotation. In these embodiments, the average may be taken over one OFDM-symbol (over the different sub-carriers, i.e. in the frequency direction), and/or over several OFDM-symbols (i.e. in the time direction).

According to some embodiments of the invention, the phase rotation is removed by changing the order in which the samples in the FFT-window are fed to the FFT. If, for example, the FFT-window is placed one sample early (i.e. including one sample of the CP and excluding the last sample of the useful part of the OFDM-symbol), this causes a full rotation ($2\pi$) over the N sub-carriers. Thus, by estimating the number of full rotations over the N sub-carriers (or an average phase rotation per sub-carrier), it can be determined how many samples must be shifted before applying the FFT. If the FFT-window was placed early, the samples are shifted from the beginning to the end of the OFDM-symbol. If the FFT-window was placed late, samples may be shifted from the end to the beginning of the OFDM-symbol to remove the frequency dependent phase rotation. It should be noted, however, that in this latter case ISI and/or inter-carrier interference (ICI) remains a serious problem even after the phase rotation has been removed.

According to other embodiments of the invention, the phase rotation is removed by multiplying the signal at the output of the FFT with a frequency dependent phase, that is, by de-rotating the signal. The signal may be de-rotated, for example, by multiplying the FFT-output signal by a frequency dependent phase, such as $\exp(j2\pi n\epsilon/N)$, where n denotes the $n^{th}$ sub-carrier, and E has been estimated based on the phase rotation as described above. When the phase rotation is entirely due to an erroneously placed FFT-window, $\epsilon$ is the FFT-window offset l in number of samples.

The delay spread may then be estimated based on the signal after the phase rotation has been removed, according to any delay spread estimation algorithm. In some embodiments, for example, the total number of axis (zero) crossings of both (or one of) the real axis and the imaginary axis is counted and the delay spread estimate is based on the number of zero-crossings. The delay spread of the channel, $\tau$, may, for example, be estimated as $\tau = C \cdot ZCR$, where ZCR is the zero-crossing rate measured in number of crossings per frequency unit. The parameter C may, for example, be estimated by means of simulation.

In alternative embodiments, the delay spread may be estimated based on the signal either before or after the phase rotation has been removed. Delay spread estimation based on the signal before the phase rotation has been removed may be based on delay spread estimation algorithms that are not based on the phase variations of the channel as explained above.

Figure 6:
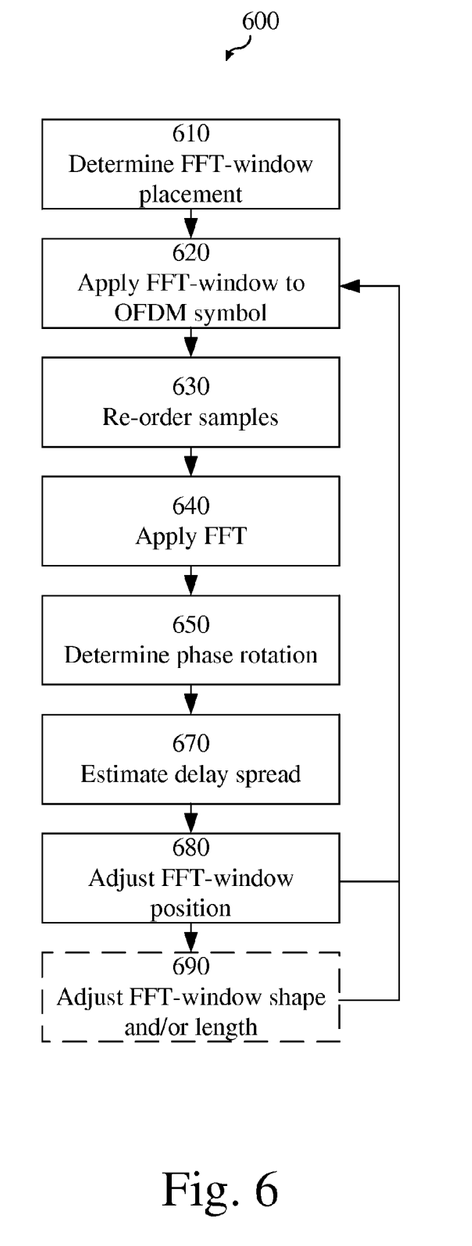
FIG. 6 is a flow chart illustrating a method for positioning the FFT-window according to some embodiments of the invention.

FIG. 6 is a flow chart illustrating an example method 600 for adjusting an FFT-window position according to some embodiments of the invention. In step 610, an initial placement of the FFT-window is determined in relation to OFDM-symbols contained in a received OFDM-signal. The method may use one or more OFDM-symbols to determine the FFT-window placement. The method may, for example, take an expected or estimated amount of inter-symbol interference into account when determining the FFT-window placement. The method may also use a previous delay spread estimate when determining the FFT-window placement. The placement of the FFT-window in step 610 may be performed by a pre-FFT algorithm.

Before the FFT-window placement is determined, a frequency offset may be estimated and compensated for. The estimation may, for example, be done via a correlation with regard to the CP or by utilizing a synchronization channel, such as SCH in UMTS LTE. The frequency offset compensation may, for example, be accomplished through a digital rotator or in the analogue domain by feedback to a voltage controlled oscillator (VCO). Such operations are also well known in the art.

Then, the initial position for the FFT-window is found in step 610, for example through a correlation with the CP. Such methods are well known in the art and examples may be found, e.g. in J.-J. van de Beek, et. al., "A Time and Frequency Synchronization Scheme for Multiuser OFDM", IEEE Journal on Selected Areas in Communications, vol. 17, no. 11, November 1999. Depending on various circumstances such as the channel conditions, the initial position might be good or it might need adjustment. The requirement on the placement of the FFT-window at this stage may be that it should be good enough to allow for useful processing of the signal after the FFT. For example, there may be requirements on the amount of ISI that is allowable.

When the FFT-window placement has been determined in step 610, the method continues to step 620, where the determined FFT-window placement is applied to the OFDM-signal to obtain an OFDM-symbol. This OFDM-symbol may be the same OFDM-symbol as was used for determining the FFT-window placement in step 610 (or one of the OFDM-symbols used in step 610 if more than one OFDM-symbols were used in step 610), or it may be a subsequent OFDM-symbol. The samples in the FFT-window are re-ordered based on a frequency dependent phase rotation estimate in step 630 if a frequency dependent phase rotation has been estimated as explained above. If no frequency dependent phase rotation estimate exists yet, step 630 is merely by-passed.

A fast Fourier transfer (FFT) is applied to the (possibly re-ordered) samples of the OFDM-symbol in step 640, and the signal output from the FFT calculation is used to determine the frequency dependent phase rotation in step 650 using methods as explained above. In some embodiments, an average frequency dependent phase rotation is determined. The determined frequency dependent phase rotation may be input to step 630 to be used in the processing of a subsequent OFDM-symbol, or for further processing of the same OFDM-symbol. In some embodiments, the process returns to step 630 where the samples are re-ordered in the OFDM-symbol under consideration and then the FFT is re-applied to the OFDM-symbol in step 640 before continuing the processing of the OFDM-symbol in step 670.

The determination of the frequency dependent phase rotation in step 650 may be based on channel estimates, for example in the form of an estimate of the transfer function of the channel. The channel estimates may, for example, be calculated from the pilot symbols (if any) in the OFDM-symbol. In such a case, the positions of the pilot symbols must be determined. In the example of FIG. 3, pilot symbols are only available in the first and in the fifth OFDM-symbol in a slot. Thus, in such cases, one must know which one of the OFDM-symbols is currently being processed in order to know if there are any pilot symbols available. With knowledge of where the pilot symbols are located in the time-frequency grid, the channel can be estimated for these positions using methods well known in the art. In some embodiments, the channel estimation may (alternatively or additionally) be based on non-pilot symbols of an OFDM-symbol.

Then, in step 670, the delay spread of the channel is estimated using the channel estimates, and in step 680, the FFT-window position is adjusted based on at least the delay spread estimation and the determined frequency dependent phase rotation. In optional step 690, the length and/or shape of the FFT-window may be adjusted based on at least the estimated delay spread.

Then, the method returns to step 620 where the processing of a new OFDM-symbol commences using the adjusted FFT-window position. Alternatively, when returning to step 620, the method may re-process the same OFDM-symbol using the adjusted FFT-window processing to enhance the demodulation performance for that OFDM-symbol.

Figure 7:
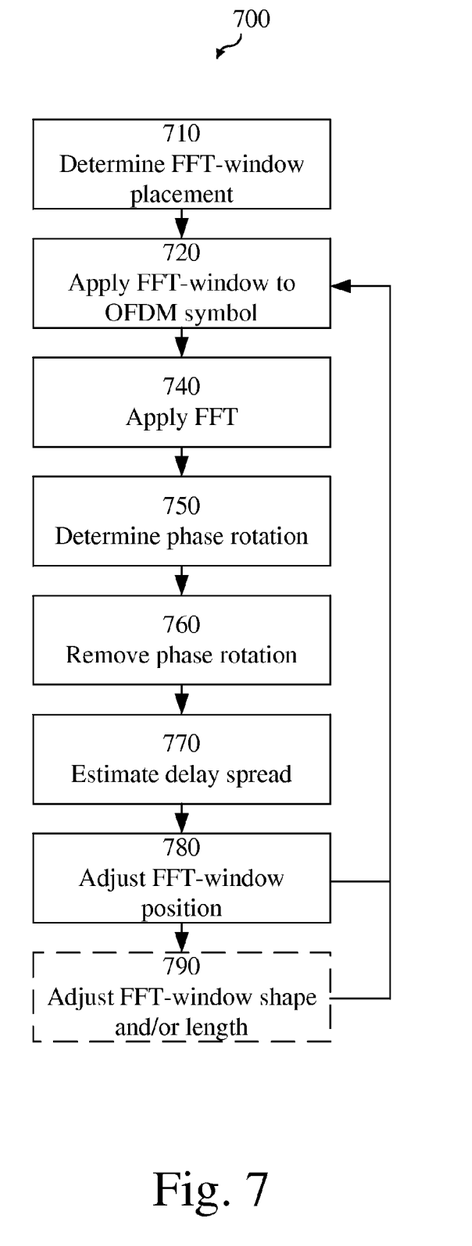
FIG. 7 is a flow chart illustrating a method for positioning the FFT-window according to some embodiments of the invention.

An alternative solution is shown in FIG. 7, which is a flow chart illustrating an example method 700 for adjusting an FFT-window position according to some embodiments of the invention. Step 710 and step 720 may determine an FFT-window placement and apply the FFT-window to an OFDM-signal in the same manner as step 610 and 620 of FIG. 6 respectively.

An FFT is then applied to the samples of the OFDM-symbol in the FFT-window in step 740, and the signal output from the FFT calculation is used to determine a frequency dependent phase rotation in step 750 using methods as explained above. In step 760, the determined frequency dependent phase rotation is removed from the FFT-output signal. For example, the FFT-output signal may undergo a de-rotation process to remove the frequency dependent phase rotation.

Then, in step 770, the delay spread of the channel is estimated using methods as explained above. As explained before, the delay spread estimation may be performed using the de-rotated FFT-output, or using the FFT-output before de-rotation. In step 780, the FFT-window position is adjusted based on at least the delay spread estimation and the determined frequency dependent phase rotation. In optional step 790, the length and/or shape of the FFT-window may be adjusted based on at least the estimated delay spread.

Then, the method returns to step 720 where the processing of a new OFDM-symbol commences using the adjusted FFT-window position. Alternatively, when returning to step 720, the method may re-process the same OFDM-symbol using the adjusted FFT-window processing to enhance the demodulation performance for that OFDM-symbol.

In some embodiments, such as those described by FIGS. 6 and 7, the determination of the frequency dependent phase rotation may be performed for every OFDM-symbol or for just some OFDM-symbols (for example, those comprising pilot symbols). When the determination is performed for just some OFDM-symbols, the determined values may be used also for the OFDM-symbols where no determination is made. The same principle applies to the delay spread estimation.

Furthermore, it is emphasized that the entire process described in connection to FIGS. 6 and 7 may be carried out using a single OFDM-symbol. Thus, in that case, the same OFDM-symbol is used for the initial placement of the FFT-window, and for determining the frequency dependent phase rotation and calculating the delay spread estimation after the FFT has been applied. In other embodiments, different or multiple OFDM-symbols may be used in the different stages of the process.

Some of the embodiments of the invention have been described for the situation where the delay spread was estimated using pilot symbols that are transmitted interlaced with the data. Although this may be a suitable approach when pilot symbols are placed, for example, as shown in FIG. 3, these embodiments of the invention are by no means limited to this situation. If no pilot symbols are available, and also in other situations, the determination of the phase rotation and delay spread estimation may be based on channel estimations at other positions in the time-frequency grid. Furthermore, when there are pilot symbols available, and the channel has been estimated also for one or more of the sub-carriers in between the pilot symbols, these additional channel estimates may also be used for determining the phase rotation and for calculating the delay spread estimation.

Figure 8:
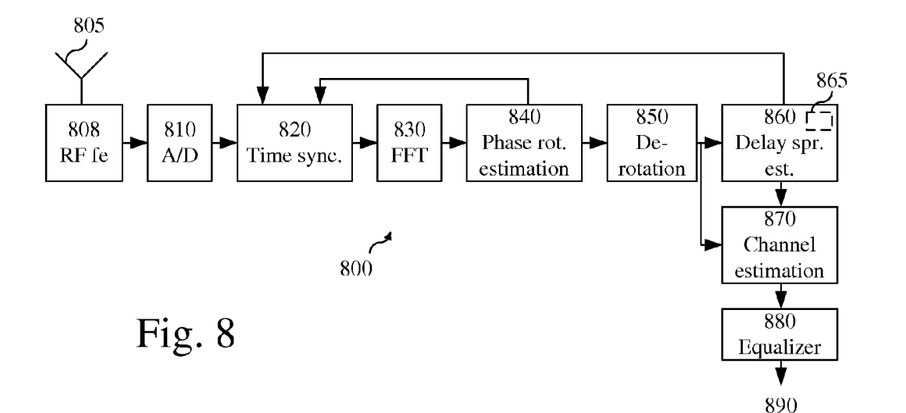
FIG. 8 is a block diagram illustrating parts of a receiver according to some embodiments of the invention.

FIG. 8 is a block diagram illustrating part of an example OFDM receiver 800 according to some embodiments of the invention. The example receiver 800 may, for example, be part of an electronic apparatus and may be adapted to perform one or more method steps as presented in FIG. 7.

In the example receiver 800, an OFDM-signal comprising one or more OFDM-symbols is received by one or more antennas 805, processed (e.g. filtered, amplified, and down-mixed to a baseband signal) by radio frequency front end 808, and converted to a digital signal by A/D converter 810.

In the example receiver, A/D converter 810 is connected to block 820, which comprises FFT-window placement circuitry, such as a time synchronization unit, adapted to determine a position of an FFT-window in relation to an OFDM-symbol.

The output of the FFT-window placement circuitry 820 is connected to block 830 comprising FFT circuitry, such as an FFT calculation unit, adapted to produce an FFT-output signal. The output of the FFT circuitry 830 is connected to block 840, which comprises circuitry, such as a phase rotation estimator, adapted to determine a frequency dependent phase rotation component of the FFT-output signal. The phase rotation estimator 840 may also be adapted to calculate channel estimates for use in the determination of the frequency dependent phase rotation component. Alternatively, the phase rotation estimator 840 may receive such channel estimates from another block, such as a channel estimation unit 870 or a delay spread estimator 850. Block 840 is connected to block 850, which comprises circuitry, such as a de-rotator, adapted to remove the determined frequency dependent phase rotation component from the FFT-output signal. The determined frequency dependent phase rotation may, for example be removed by de-rotating the samples of the FFT-output signal.

Block 850 is connected to block 860, which comprises delay spread estimation circuitry, such as a delay spread estimator. The delay spread estimation circuitry 860 is adapted to calculate a delay spread estimate based on the de-rotated FFT-output signals. The delay spread estimator 860 may also be adapted to calculate channel estimates for use in the calculation of the delay spread estimate. Alternatively, the delay spread estimator 860 may receive such channel estimates from another block, such as a channel estimation unit 870 or a phase rotation estimator 840. The delay spread estimation circuitry 860 may also comprise a filter 865 for filtering the estimated delay spread or other parameters of the delay spread estimation algorithm. In some embodiments, the filter 865 is implemented as a separate block connected to block 860.

The output of the de-rotator 850 is also connected to block 870, which comprises a channel estimation unit, such as a channel estimator. Thus, in this example, the channel estimator is adapted to calculate channel estimates based on the de-rotated FFT-output signals. In other examples, the channel estimator may be adapted to calculate channel estimates based on the FFT-output signals before de-rotation. In this example receiver, the channel estimation unit is also connected to block 860, which outputs a delay spread estimate. The channel estimation unit may be adapted to estimate the channel based on at least the compensated FFT-output signal and the delay spread estimate. In other embodiments, the channel estimation unit may be adapted to estimate the channel based on at least the FFT-output signal and the delay spread estimate, and may also take the determined frequency dependent phase rotation component into account. The channel estimation unit 870 may be adapted to estimate the channel at some or all of the positions in the time-frequency grid of the OFDM-signal. In particular, the channel estimation unit 870 may be adapted to determine channel estimates for the pilot positions and interpolate these channel estimates to obtain channel estimates for the non-pilot positions.

The channel estimation unit 870 is connected to block 880, which comprises an equalizer, whose output is forwarded to circuitry for further processing as indicated at 890.

In this example embodiment, the FFT-window placement circuitry 820 receives the delay spread estimate from block 860 and the determined frequency dependent phase rotation component from block 840 and uses these parameters to adjust the FFT-window position. The FFT-window placement circuitry 820 may also use the delay spread estimate and possibly the determined frequency dependent phase rotation component to adjust a length and/or shape of the FFT-window.

Figure 9:
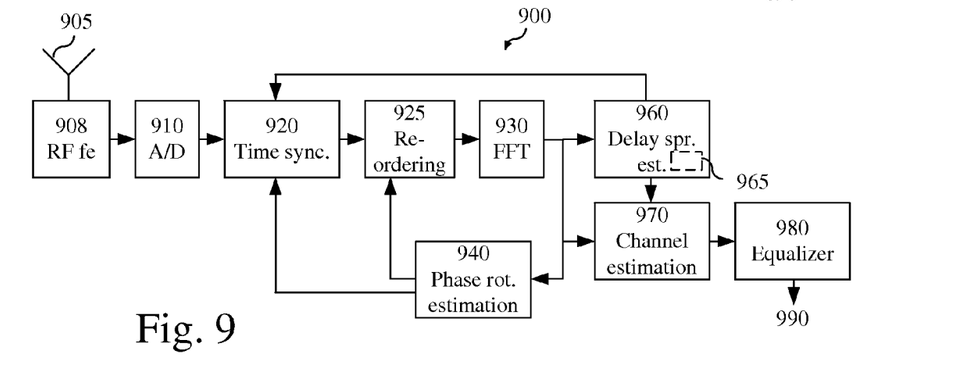
FIG. 9 is a block diagram illustrating parts of a receiver according to some embodiments of the invention.

FIG. 9 is a block diagram illustrating part of an example OFDM receiver 900 according to some embodiments of the invention. The example receiver 900 may, for example, be part of an electronic apparatus and may be adapted to perform one or more method steps as presented in FIG. 6.

In the example receiver 900, an OFDM-signal comprising one or more OFDM-symbols is received by one or more antennas 905, processed (e.g. filtered, amplified, and downmixed to a baseband signal) by radio frequency front end 908, and converted to a digital signal by A/D converter 910.

In the example receiver, A/D converter 910 is connected to block 920, which comprises FFT-window placement circuitry, such as a time synchronization unit, adapted to determine a position of an FFT-window in relation to an OFDM-symbol.

The output of the FFT-window placement circuitry 920 is connected to block 925, which comprises re-arranging circuitry adapted to re-order the samples output from the FFT-window placement circuitry based on a frequency dependent phase rotation estimate.

The output from block 925 is connected to block 930 comprising FFT circuitry, such as an FFT calculation unit, adapted to produce an FFT-output signal. The output of the FFT circuitry 930 is connected to block 940, which comprises circuitry, such as a phase rotation estimator, adapted to determine a frequency dependent phase rotation component of the FFT-output signal. The phase rotation estimator 940 may also be adapted to calculate channel estimates for use in the determination of the frequency dependent phase rotation component. Alternatively, the phase rotation estimator 940 may receive such channel estimates from another block, such as a channel estimation unit 970 or a delay spread estimator 950. An output of block 940 is connected to block 925.

FFT circuitry 930 is also connected to block 960, which comprises delay spread estimation circuitry, such as a delay spread estimator. The delay spread estimation circuitry 960 is adapted to calculate a delay spread estimate based on the FFT-output. The delay spread estimator 960 may also be adapted to calculate channel estimates for use in the calculation of the delay spread estimate. Alternatively, the delay spread estimator 960 may receive such channel estimates from another block, such as a channel estimation unit 970 or a phase rotation estimator 940. The delay spread estimation circuitry 960 may also comprise a filter 965 for filtering the estimated delay spread or other parameters of the delay spread estimation algorithm. In some embodiments, the filter 965 is implemented as a separate block connected to block 960.

The output of the FFT circuitry 930 is also connected to block 970, which comprises a channel estimation unit, such as a channel estimator. In this example receiver, the channel estimation unit is also connected to block 960, which outputs a delay spread estimate. The channel estimation unit may be adapted to estimate the channel based on at least the FFT-output signal and the delay spread estimate. The channel estimation unit may also take the determined frequency dependent phase rotation component into account. The channel estimation unit 970 may be adapted to estimate the channel at some or all of the positions in the time-frequency grid of the OFDM-signal. In particular, the channel estimation unit 970 may be adapted to determine channel estimates for the pilot positions and interpolate these channel estimates to obtain channel estimates for the non-pilot positions.

The channel estimation unit 970 is connected to block 980, which comprises an equalizer, whose output is forwarded to circuitry for further processing as indicated at 990.

In this example embodiment, the FFT-window placement circuitry 920 receives the delay spread estimate from block 960 and the determined frequency dependent phase rotation component from block 940 and uses these parameters to adjust the FFT-window position. The FFT-window placement circuitry 920 may also use the delay spread estimate and possibly the determined frequency dependent phase rotation component to adjust a length and/or shape of the FFT-window.

In FIGS. 8 and 9, the channel estimation units 870, 970, the phase rotation estimator 840 and the delay spread estimators 860, 960 have been portrayed as part of the signal processing flow chain. In other embodiments of the invention, one or more of these blocks may be implemented along side of (and connected to various blocks as suitable of) the signal processing flow chain.

The described embodiments of the invention and their equivalents may be performed by general-purpose circuits associated with or integral to an OFDM receiver, such as digital signal processors (DSP), central processing units (CPU), co-processor units, or by specialized circuits such as for example application-specific integrated circuits (ASIC). All such forms are contemplated to be within the scope of the invention.

The invention may be embodied within an electronic apparatus comprising a receiver having circuitry or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station in a telecommunication system.

Figure 10:
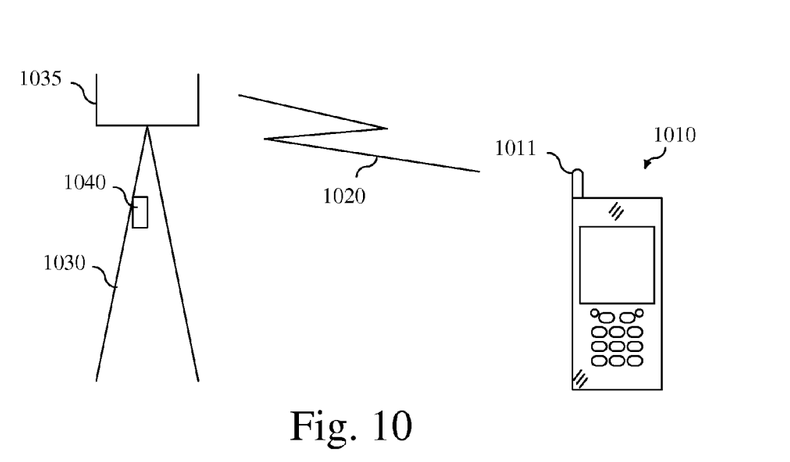
FIG. 10 is a schematic front view of a mobile terminal connected, through a radio link, to a base station site, wherein the mobile terminal and/or the base station may comprise an electronic apparatus according to some embodiments of the invention.

FIG. 10 illustrates an example mobile terminal 1010 connected, through a radio link 1020, to a base station site 1030. The base station site 1030 comprises one or more antennas 1035 and at least one base station 1040. The base station 1040 and/or the mobile terminal 1010 may be adapted to calculate delay spread estimates according to embodiments of the invention.

The mobile terminal 1010 is illustrated as a mobile telephone in a schematic front view. This example mobile terminal 1010 comprises an antenna 1011 mounted on the housing of the apparatus. Alternatively, the mobile terminal 1010 may have an internal antenna mounted within the housing of the apparatus. The mobile terminal 1010 may even comprise multiple antennas. The mobile terminal 1010 may further comprise a display, a keypad, a loudspeaker, and a microphone, which together provides a man-machine interface for operating the mobile terminal 1010.

The example mobile terminal 1010 is adapted to connect to a mobile telecommunication network via the wireless link 1020 to the radio base station 1040. Hence, a user of the mobile terminal 1010 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 1010 and the base station 1040 may be compliant with at least one mobile telecommunication standard, for instance UMTS LTE. Alternatively or additionally, the mobile terminal 1010 may be adapted to connect to a digital broadcast system and to receive signals on accordance with at least one standard for digital broadcast, such as DVB-H or DAB.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the base station 1040 and/or mobile terminal 1010. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in FIGS. 6 and 7.

One advantage of some embodiments of the invention is that the FFT-window position may be adjusted to account for the delay spread of the channel.

An additional advantage of some embodiments of the invention is that the FFT-window position may be adjusted based on an estimated frequency dependent phase rotation.

A further advantage of some of the embodiments of the invention is that the FFT-window length may be adjusted based on the estimated delay spread of the channel, so that more signal energy may be used in the processing of the received signal.

A further advantage of some of the embodiments of the invention is that the FFT-window shape may be adjusted based on the estimated delay spread of the channel.

Other advantages of some embodiments of the invention are low complexity implementation and robustness. In particular, robustness against time dispersion and noise and against an inferior or erroneous initial position of the FFT-window is attained. Furthermore, embodiments of the invention provides for robustness against estimation errors.

A further advantage of some embodiments of the invention is that they provide for accurate positioning of the FFT-window.

Another advantage of embodiments of the invention is that it provides for low complex channel estimation.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

The invention claimed is:

1. A method of an Orthogonal Frequency Division Multiplexing—OFDM—receiver for positioning a fast Fourier transform—FFT—window, comprising:
   determining a position of the FFT-window in relation to one or more OFDM-symbols of a received OFDM-signal;
   using the position of the FFT-window to obtain a first OFDM-symbol from the received OFDM-signal;
   applying an FFT to the first OFDM-symbol to produce an FFT-output signal;
   determining a frequency dependent phase rotation component of the FFT-output signal based on the FFT-output signal;
   removing the determined frequency dependent phase rotation component from the FFT-output signal to obtain a compensated FFT-output signal;
   calculating a delay spread estimate using at least one of the FFT-output signal and the compensated FFT-output signal; and
   adjusting the position of the FFT-window based on at least the determined frequency dependent phase rotation component and the calculated delay spread estimate.

2. The method of claim 1, further comprising:
   using the adjusted position of the FFT-window to obtain a second OFDM-symbol from the received OFDM-signal, wherein the second OFDM-symbol may be identical to or different from the first OFDM-symbol; and
   applying an FFT to the second OFDM-symbol.

3. The method of claim 2, wherein the step of removing the determined frequency dependent phase rotation component is performed prior to the step of applying the FFT to the second OFDM-symbol and comprises re-ordering samples of the second OFDM-symbol based on the determined frequency dependent phase rotation component.

4. The method of claim 1, wherein the step of removing the determined frequency dependent phase rotation component comprises re-ordering samples of the first OFDM-symbol based on the determined frequency dependent phase rotation component and re-applying the FFT to the first OFDM-symbol.

5. The method of claim 1, wherein the step of removing the determined frequency dependent phase rotation component is performed after the step of applying the FFT to the first OFDM-symbol and comprises de-rotating samples of the FFT-output signal.

6. The method of claim 1 further comprising:
   determining, based on at least one of the FFT-output signal and the compensated FFT-output signal, a transfer function of a channel over which the received OFDM-signal has been transmitted; and
   wherein the step of calculating a delay spread estimate comprises:
     determining a number of zero-crossings of at least one of a real component and an imaginary component of the transfer function; and
     calculating the delay spread estimate based on the determined number of zero-crossings.

7. The method of claim 1, wherein the frequency dependent phase rotation component is determined as an average frequency dependent phase rotation component.

8. The method of claim 1, further comprising:
   determining a width of the FFT-window based on at least the calculated delay spread estimate.

9. The method of claim 1, further comprising:
determining a shape of the FFT-window based on at least the calculated delay spread estimate.

10. A nontransitory computer readable medium, having stored thereon a computer program comprising program instructions, the computer program being loadable into a data-processing unit and adapted to cause the data-processing unit to execute a method when the computer program is run by the data-processing unit, wherein the method of an Orthogonal Frequency Division Multiplexing—OFDM—receiver is for positioning a fast Fourier transform—FFT—window, the method comprising:
determining a position of the FFT-window in relation to one or more OFDM-symbols of a received OFDM-signal;
using the position of the FFT-window to obtain a first OFDM-symbol from the received OFDM-signal;
applying an FFT to the first OFDM-symbol to produce an FFT-output signal;
determining a frequency dependent phase rotation component of the FFT-output signal based on the FFT-output signal;
removing the determined frequency dependent phase rotation component from the FFT-output signal to obtain a compensated FFT-output signal;
calculating a delay spread estimate using at least one of the FFT-output signal and the compensated FFT-output signal; and
adjusting the position of the FFT-window based on at least the determined frequency dependent phase rotation component and the calculated delay spread estimate.

11. An electronic apparatus of an Orthogonal Frequency Division Multiplexing—OFDM—receiver for positioning a fast Fourier transform—FFT—window, comprising:
FFT-window placement circuitry adapted to determine a position of an FFT-window in relation to one or more OFDM-symbols of a received OFDM-signal and to use the position of the FFT-window to obtain at least one OFDM-symbol from the received OFDM-signal;
FFT circuitry adapted to produce an FFT-output signal from the at least one OFDM-symbol;
at least one delay spread estimator adapted to calculate a delay spread estimate;
circuitry adapted to determine a frequency dependent phase rotation component of the FFT-output signal based on the FFT-output signal;
circuitry adapted to remove the determined frequency dependent phase rotation component from the FFT-output signal to obtain a compensated FFT-output signal;
that the at least one delay spread estimator is further adapted to calculate the delay spread estimate using at least one of the FFT-output signal and the compensated FFT-output signal; and
that the FFT-window placement circuitry is further adapted to adjust the position of the FFT-window based on at least the determined frequency dependent phase rotation component and the calculated delay spread estimate.

12. The electronic apparatus of claim 11, wherein the circuitry adapted to remove the determined frequency dependent phase rotation component is associated with the FFT-window placement circuitry and the FFT circuitry and is adapted to re-order samples of the at least one OFDM-symbol based on the determined frequency dependent phase rotation component.

13. The electronic apparatus of claim 11, wherein the circuitry adapted to remove the determined frequency dependent phase rotation component is adapted to de-rotate samples of the FFT-output signal.

14. The electronic apparatus of claim 11 further comprising:
a circuitry adapted to determine, based on at least one of the FFT-output signal and the compensated FFT-output signal, a transfer function of a channel over which the received OFDM-signal has been transmitted; and
wherein the at least one delay spread estimator is further adapted to:
determine a number of zero-crossings of at least one of a real component and an imaginary component of the transfer function; and
calculate the delay spread estimate based on the determined number of zero-crossings.

15. The electronic apparatus of claim 11, wherein the circuitry adapted to determine a frequency dependent phase rotation component of the FFT-output signal is further adapted to determine the frequency dependent phase rotation component as an average frequency dependent phase rotation component.

16. The electronic apparatus of claim 11, wherein the FFT-window placement circuitry is further adapted to:
determine a width of the FFT-window based on at least the calculated delay spread estimate.

17. The electronic apparatus of claim 11, wherein the FFT-window placement circuitry is further adapted to:
determine a shape of the FFT-window based on at least the calculated delay spread estimate.

18. The electronic apparatus of claim 11, wherein the apparatus complies with the Universal Mobile Telecommunications System Long Term Evolution standard.

19. The electronic apparatus of claim 11, wherein the electronic apparatus is a portable or handheld mobile radio communication equipment, a mobile radio terminal, a mobile telephone, a pager, a communicator, an electronic organizer, a smartphone, a computer, an embedded drive, a mobile gaming device, a watch or a base station.

* * * * *

UNITED STATES PATENT AND TRADEMARK OFFICE
CERTIFICATE OF CORRECTION

PATENT NO. : 8,594,210 B2  Page 1 of 1
APPLICATION NO. : 12/746518
DATED : November 26, 2013
INVENTOR(S) : Wilhelmsson et al.

It is certified that error appears in the above-identified patent and that said Letters Patent is hereby corrected as shown below:

In the Drawings

In Fig. 3, Sheet 1 of 4, delete Tag "306" and insert Tag -- 305 --, therefor.

In the Specification

In Column 8, Line 49, delete "$H_{k,n}=\alpha_{k,n}\exp(-j2\pi nl/N)$," and insert -- $H_{k,n}=\alpha\exp(-j2\pi nl/N)$, --, therefor.

In Column 11, Line 46, delete "EP207184" and insert -- EP2071784 --, therefor.

In Column 11, Line 48, delete "2007" and insert -- 2007, --, therefor.

In Column 13, Line 13, delete "E" and insert -- ε --, therefor.

In Column 16, Line 18, delete "delay spread estimator 850." and insert -- delay spread estimator 860. --, therefor.

In Column 17, Line 38, delete "delay spread estimator 950." and insert -- delay spread estimator 960. --, therefor.

In the Claims

In Column 21, Line 10, in Claim 10, delete "receiver is" and insert -- receiver --, therefor.

Signed and Sealed this
Eighth Day of July, 2014

Michelle K. Lee
*Deputy Director of the United States Patent and Trademark Office*